(12) United States Patent
Matsumoto

(10) Patent No.: US 7,576,741 B2
(45) Date of Patent: Aug. 18, 2009

(54) METHOD, COMPUTER PROGRAM PRODUCT, AND DEVICE FOR PROCESSING PROJECTION IMAGES

(75) Inventor: Kazuhiko Matsumoto, Tokyo (JP)

(73) Assignee: Ziosoft Inc. (JP)

( * ) Notice: Subject to any disclaimer, the term of this patent is extended or adjusted under 35 U.S.C. 154(b) by 345 days.

(21) Appl. No.: 10/970,180

(22) Filed: Oct. 21, 2004

(65) Prior Publication Data
US 2005/0275654 A1    Dec. 15, 2005

(30) Foreign Application Priority Data
Jun. 15, 2004   (JP)   ............... 2004-177166

(51) Int. Cl.
  G06T 17/00  (2006.01)
  G06T 15/10  (2006.01)
(52) U.S. Cl. .................... 345/424; 345/427
(58) Field of Classification Search ............ 345/424, 345/6; 378/4
See application file for complete search history.

(56) References Cited

U.S. PATENT DOCUMENTS 5,566,282 A * 10/1996 Zuiderveld .......... 345/424
5,793,375 A    8/1998 Tanaka
6,377,229 B1 * 4/2002 Sullivan ............... 345/6
6,862,334 B2 * 3/2005 Van Liere et al. ......... 378/4

FOREIGN PATENT DOCUMENTS

JP   07-129786    5/1995
JP   2000-107169  4/2000

OTHER PUBLICATIONS

Etienne et al., ""Soap-Bubble" Visualization and Quantitative Analysis of 3D Coronary Magnetic Resonance Angiograms", 2002, Wiley-Liss, Inc., pp. 658-666.*
Greene et al., "Hierarcical Z-Buffer Visibility", 1993, ACM.*
Appendix (Prior Art Information List).

* cited by examiner

Primary Examiner—Chante Harrison
(74) Attorney, Agent, or Firm—Caesar, Rivise, Bernstein, Cohen & Pokotilow, Ltd.

(57) ABSTRACT

A method for improving the quality of a projection image. The method includes setting a plurality of rays that pass through voxels. Each ray corresponds to a pixel. The method further includes storing a plurality of pixel values, each associated with one of the voxels existing on each of the rays. The method also stores a plurality of coordinates, each corresponding to one of the pixel values, and determines a noise position in the voxels pixels based on the coordinates.

30 Claims, 11 Drawing Sheets

METHOD, COMPUTER PROGRAM PRODUCT, AND DEVICE FOR PROCESSING PROJECTION IMAGES

BACKGROUND OF THE INVENTION

The present invention relates to a method, computer program product, and device for processing projection images, and more specifically, to a method, computer program product, and device for processing noise within image data of projection images.

Conventionally, medical image information generated by diagnostic medical imaging devices such as diagnostic X ray devices, CT X ray devices, magnetic resonance imaging devices (MRI devices), and the like are used in performing medical procedures such as medical diagnostics and treatment. Medical image information is processed to obtain an image which can be displayed three-dimensionally, and the image is viewed for the purpose of diagnosis or treatment. Two types of methods for displaying three-dimensional images are described below.

One such method extracts from medical image information a region that is to be displayed, such as an internal organ and the like, to generate an image of the surface of the organ or the like from the image data of the extracted region (hereinafter referred to as "surface display method"). Another method is the volume rendering method. In the surface display method and volume rendering method, volume data including three-dimensional pixels (voxels) are created using medical image information (three-dimensional data formed by a collection of two-dimensional cross-sectional images (slices)). In the surface display method, a display subject (e.g., bone or organ) is extracted from volume data as a region-of-interest, and only this region-of-interest is viewed.

U.S. Pat. No. 5,793,375 discloses an example of a method for extracting a region-of-interest. In order to extract a region-of-interest, voxel data, which include voxels having tone values, are first binarized based on predetermined threshold values so as to generate binarized voxel data. Thereafter, a light beam is extended from each pixel to the binarized voxel data, and the length of the light beam required to reach a voxel (region-of-interest voxel) which has a value of "1" is determined. A depth image is created based on the lengths of the light beams corresponding to the pixels. The coordinates on the surface of the display subject are calculated backward from the depth image. An image is created for displaying the surface of a subject by determining and projecting a planar normal line based on the voxel value of specific voxel data and the voxel value of adjacent voxel data.

In volume rendering, a light beam is directly projected on volume data to create an image. A particularly often used method is maximum intensity projection (MIP). In MIP, voxel data is prepared similarly to the previously mentioned surface display method, and an optical path is set through the voxel data. Then, a MIP image which has been generated based on the voxel data having maximum values on the optical path (pixel value of each pixel of the medical image information) is displayed on the two-dimensional plane of the projection surface at a right angle to the optical path.

There may be occasions when noise is included in the medical image information forming the basis of the display image. In the surface display method, when such noise exceeds a threshold value, the noise may be erroneously recognized as the region-of-interest. Accordingly, the displayed image may not meet the requirements of the user. In MIP, noise contained in the medical image information may also be erroneously recognized as maximum data on the optical path. For example, although a user may desire an MIP image MP1, which does not include noise as shown in FIG. 1, the actual displayed MIP image MP2 may include dot-like noise N, as shown in FIG. 2. Such noise may hinder accurate diagnosis and treatment.

SUMMARY OF THE INVENTION

The present invention provides a projection image processing method, a projection image processing computer program product, and a projection image processing device, which improve the image quality of projection images.

One aspect of the present invention is a method for generating a projection image projected on a two-dimensional frame from image data of three or more dimensions that includes a plurality of first pixels of three or more dimensions. Each first pixel has a value and a coordinate. The projection image includes a plurality of second pixels. The method includes setting a plurality of rays that pass through some of the first pixels, with each ray corresponding to one of the second pixels; storing a plurality of first values, each associated with one of the first pixels existing on each of the rays; storing a plurality of first coordinates, each corresponding to one of the first values; and determining a noise position in the first pixels based on the first coordinates.

Another aspect of the present invention is a method for generating a projection image projected on a two-dimensional frame from image data of three or more dimensions that includes a plurality of first pixels of three or more dimensions. Each first pixel has a value and a coordinate. The projection image includes a plurality of second pixels. The method includes setting a plurality of rays that pass through some of the first pixels, with each ray corresponding to one of the second pixels; storing a plurality of coordinates, each associated with one of the first pixels existing on each of the rays; comparing one of the coordinates corresponding to a certain ray with one of the coordinates corresponding to another one of the rays; determining a noise position in the first pixels based on the comparison result of the coordinates; updating a plurality of the stored coordinates with the coordinates associated with the first pixels that do not include a noise position; and generating a projection image based on the stored coordinates and the values corresponding to the stored coordinates.

A further aspect of the present invention is a computer program product comprising a computer-readable medium on which a program is recorded for generating a projection image projected on a two-dimensional frame from image data of three or more dimensions that includes a plurality of first pixels of three or more dimensions. Each first pixel has a coordinate and a value. The projection image includes a plurality of second pixels. The program when executed by at least one computer performs steps including setting a plurality of rays that pass through some of the first pixels, with each ray corresponding to one of the second pixels; storing a plurality of first values, each associated with one of the first pixels existing on each of the rays; storing a plurality of first coordinates, each corresponding to one of the first values; and determining a noise position in the first pixels based on the first coordinates.

Another aspect of the present invention is a computer program product comprising a computer-readable medium on which a program is recorded for generating a projection image projected on a two-dimensional frame from image data of three or more dimensions that includes a plurality of first pixels of three or more dimensions. Each first pixel has a coordinate and a value. The projection image includes a plurality of second pixels, the program when executed by at least one computer performs steps includes setting a plurality of rays that pass through some of the first pixels, with each ray corresponding to one of the second pixels; storing a plurality of coordinates, each associated with one of the first pixels existing on each of the rays; comparing one of the coordinates corresponding to a certain ray with one of the coordinates corresponding to another one of the rays; determining a noise position in the first pixels based on the comparison result of the coordinates; updating a plurality of the stored coordinates with the coordinates associated with the first pixels that do not include a noise position; and generating a projection image based on the stored coordinates and the values corresponding to the stored coordinates.

A further aspect of the present invention is a device for generating a projection image projected on a two-dimensional frame from image data of three or more dimensions that includes a plurality of first pixels of three or more dimensions. Each first pixel has a value and a coordinate. The projection image includes a plurality of second pixels. The device includes a ray setting means for setting a plurality of rays that pass through some of the first pixels, with each ray corresponding to one of the second pixels. A value storing means stores a plurality of first values, each associated with one of the first pixels existing on each of the rays. A coordinate storing means stores a plurality of first coordinates, each corresponding to one of the first values. A noise determining means determines a noise position in the first pixels based on the first coordinates.

A further aspect of the present invention is a device for generating a projection image projected on a two-dimensional frame from image data of three or more dimensions that includes a plurality of first pixels of three or more dimensions. Each first pixel has a coordinate and a value. The projection image includes a plurality of second pixels. The device includes a memory and a processor connected to the memory. The processor sets a plurality of rays that pass through some of the first pixels, with each ray corresponding to one of the second pixels. The processor stores a plurality of first values in the memory, each associated with one of the first pixels existing on each of the rays. The processor stores a plurality of first coordinates in the memory, each corresponding to one of the first values. The processor determines a noise position in the first pixels based on the first coordinates.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
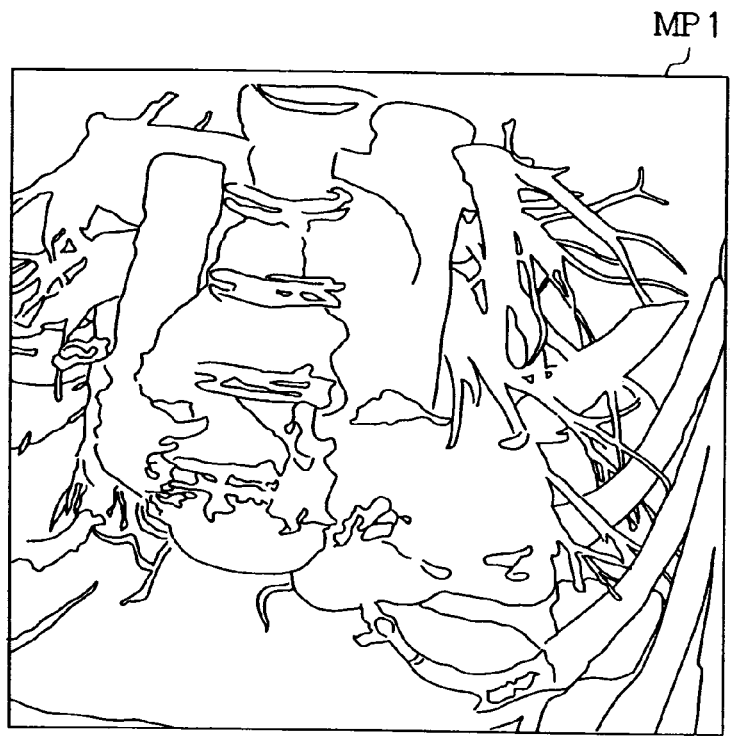
FIG. 1 is a schematic diagram of a desirable MIP image.

In the drawings, like numerals are used for like elements throughout.

First Embodiment

An image display device 1 according to a first embodiment of the present invention is described hereinafter with reference to FIGS. 3 through 13.

Figure 3:
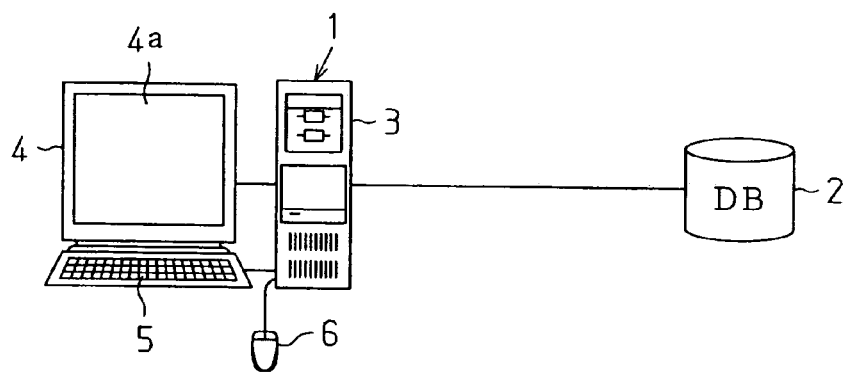
FIG. 3 is a schematic diagram showing the structure of an image display device according to a first embodiment of the present invention.

As shown in FIG. 3, the image display device 1 is connected to a database 2 (image data storage unit). The database 2 stores, for example, CT image data acquired by a computerized tomography (CT) image projection device. The image display device 1 reads CT image data from the database 2, generates various images used for medical diagnosis and treatment, and displays these images on a screen. Although the image display device of the first embodiment uses CT image data, the image data used by the image display device is not limited to CT image data. Usable image data includes data obtained by medical image processing devices, such as CT and magnetic resonance imaging (MRI). Furthermore, data combined with such data, or data generated by processing such data also may be used.

The image display device 1 is provided with a computer (workstation, or personal computer) 3, a monitor 4, and input devices, such as a keyboard 5 and mouse 6. The computer 3 is connected to the database 2.

Figure 4:
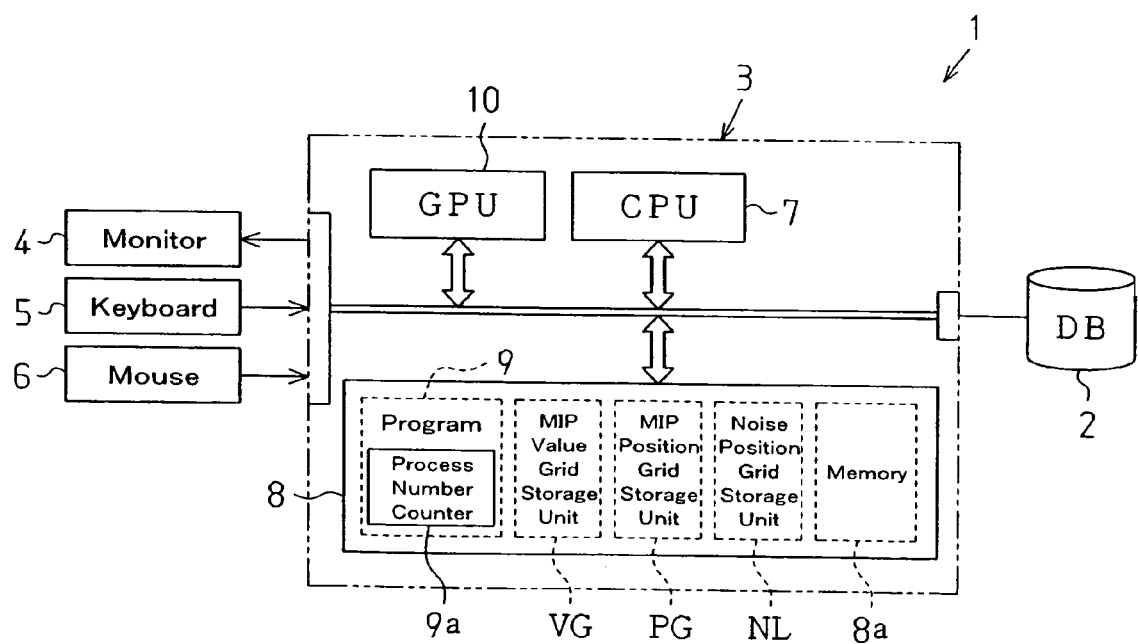
FIG. 4 is a block diagram schematically showing the structure of the image display device of FIG. 3.

FIG. 4 schematically shows the structure of the image display device 1. The computer 3 includes a central processing unit (CPU) 7 and a memory 8, which is provided with a hard disk. The image display device 1 reads CT image data from the database 2 or the hard disk, and acquires the voxel data from the CT image data. The memory 8 stores a program (application software) 9 for executing a MIP image calculation process. The memory 8 is provided with a memory unit 8a for temporarily storing the voxel data acquired from the CT image data. The memory 8 is provided with a MIP value grid storage unit VG for storing the MIP values (projection values). Furthermore, the memory 8 is provided with a MIP position grid storage unit PG which stores MIP positions (projection positions), and a noise position list storage unit NL which stores the noise positions. The MIP positions are each the coordinate of one of the MIP values stored in the MIP value grid storage unit VG.

The CPU 7 generates a MIP image by executing the program 9 using the voxel data obtained from the CT image data of the database 2 (MIP image calculation process). That is, in the first embodiment, the CPU 7 (computer 3), which functions as a projection image processing device, executes the projection image processing program for the MIP image calculation process (ray setting stage, projection value calculation stage, projection value position calculation stage, noise discrimination stage, post-processing stage, output stage, and the like). Accordingly, the CPU 7 (computer 3) functions as a ray setting means, a projection value calculating means, a projection value position calculating means, and a noise discriminating means.

Figure 5:
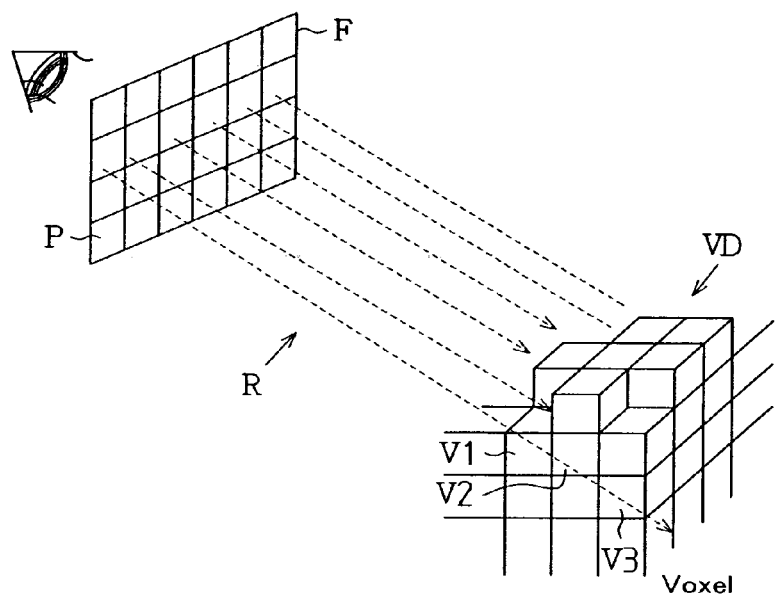
FIG. 5 is a schematic diagram illustrating a MIP.

As shown in FIG. 5, the voxel data VD is a collection of voxels, which are three-dimensional pixels. A voxel can be a cube, a block, a hexahedron, or a twisted hexahedron. A density value is allocated as a voxel value to a three-dimensional grid point. In the first embodiment, the pixel values of the CT image data, that is, the CT values, are set as density values.

The CT image data is obtained by performing cross-sectional imaging of a subject, for example, the body of a patient. The CT image data include a plurality of slices (cross-sections). Each slice of the CT image data is a two-dimensional cross-section image of bone, blood vessels, internal organs, and the like. The CT image data including a plurality of adjacent slices are obtained in the cross-section imaging. Accordingly, the CT image data is three-dimensional image data including a plurality of slices.

The CT image data has different CT values for every tissue of the subject (bone, blood vessel, organs, and the like). The CT values are X ray attenuation coefficients using water as a standard. For example, the type of tissue or lesion can be determined based on the CT value. Furthermore, the CT image data also includes all coordinate data of the cross section image (slice image) of the body scanned by the CT imaging device. The positional relationships between different tissues in a direction of the line of sight (depth direction) are discriminated from the coordinate data. In this way, the voxel data includes CT values (hereinafter referred to as "voxel values") and coordinate data.

FIG. 5 shows the process of creating a MIP image using voxel data.

MIP is the abbreviation for maximum intensity projection, and is one method for converting three-dimensional image data to two-dimensional image data. In the case of the parallel projection method shown in FIG. 5, for example, a plurality of rays (hypothetical light rays) are radiated toward voxel data VD of an observation subject from each pixel P corresponding to an image projected on a two-dimensional plane (frame) F (that is, in the direction of the line of sight). The maximum value (hereinafter referred to as "MIP value") among voxel values D1, D2 . . . Dn of an N number of voxels V1, V2, . . . Vn on each ray R is used as two-dimensional data. That is, the two-dimensional images projected on the frame F differ in accordance with the irradiation direction of the rays R (that is, the direction from which the user views the observation subject) even when the same voxel data VD are viewed. Furthermore, an image can be obtained as in the center projection method, for example, when viewing the interior of tubular organs, such as blood vessels through an endoscope by radiating the rays R in a radial manner at the voxel data VD from a single observation point. In addition, an image can be obtained as in the cylindrical projection method, such as when viewing developed tubular organs (for example, blood vessels, trachea, alimentary canal) by radiating rays R in a radial manner on the voxel data VD from viewpoints distributed on the center line of a cylinder toward the cylindrical surface extending hypothetically around the voxel data VD. In the first embodiment, the parallel projection method is used since it is most suitable for viewing the exterior of a three-dimensional image. When the ray destination position is not on the grid, a voxel value D is calculated at that position by an interpolation process using the voxel values D of the peripheral voxels V.

Figure 6:
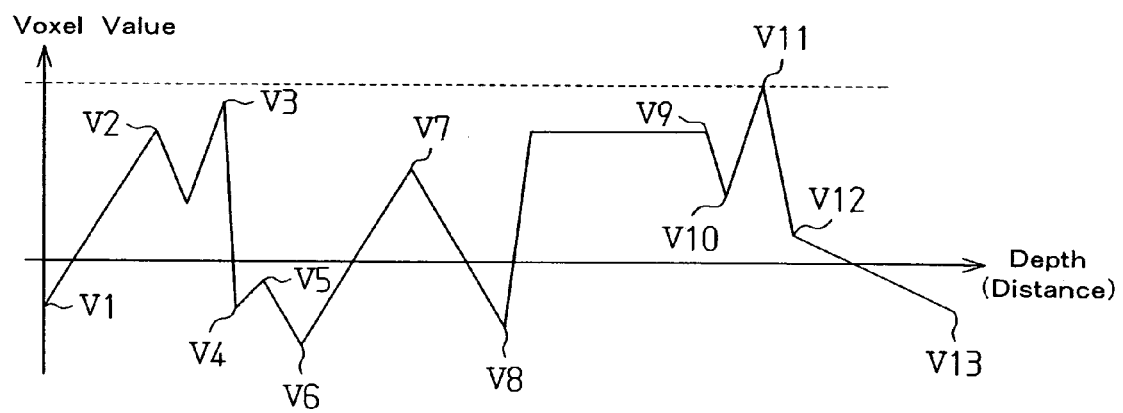
FIG. 6 is a schematic diagram illustrating the MIP value of one pixel.

Regarding single pixels, the voxel values D1 through Dn of the voxels V1 through Vn can be expressed as shown in FIG. 6, for example. FIG. 6 expresses the voxel value D of the voxel V through which ray R passes when a single ray R radiates from each pixel in direction of the line of sight. FIG. 6 corresponds to a single ray R among the plurality of rays R in FIG. 5. In FIG. 6, the horizontal axis represents the depth (distance) of the voxel V, and the vertical axis represents the voxel value D. As shown in FIG. 6, there are thirteen voxels V1 through V13 on a ray R corresponding to a specific pixel Pn, and the voxel value D11 of the voxel V11 is the maximum value. Accordingly, the voxel value D11 is set as the MIP value of the pixel Pn, and stored in the MIP value grid storage unit VG in correspondence with the pixel Pn.

The position of the voxel V11, that is, the three-dimensional grid point of the voxel having the voxel value D set as the MIP value, is stored as the MIP position in the MIP position grid storage unit PG corresponding to the pixel Pn. That is, the MIP position grid storage unit PG functions similarly to a Z-buffer of a Z-buffer method in that it stores the depth information (distance) corresponding to the two-dimensional image data. However, only the foreside data is expressed as two-dimensional data in the Z-buffer method, whereas the data having the maximum pixel value is expressed as two-dimensional data in the MIP image regardless of the depth information (distance). This distance is not limited to Euclidean distance, and also includes generalized non-Euclidean distance such as distance only in the Z direction, or distance weighed in accordance with the direction.

Similar to the pixel Pn, the MIP values are determined for all pixels of the image projected on the frame F, and respectively stored in the MIP value grid storage unit VG. These MIP values are used to form a two-dimensional image (MIP image). The MIP positions corresponding to the MIP values of all pixels of the MIP image are stored in the MIP position grid storage unit PG.

The noise position list storage unit NL stores the positions of noise included in the voxel data VD as a list (noise position list). The noise position list is created by performing a noise discrimination process during calculation of MIP value. In the first embodiment, a determination is made as to whether or not data contained in the voxel data VF includes noise based on the form of the MIP positions stored in the MIP position grid storage unit PG.

Figure 7:
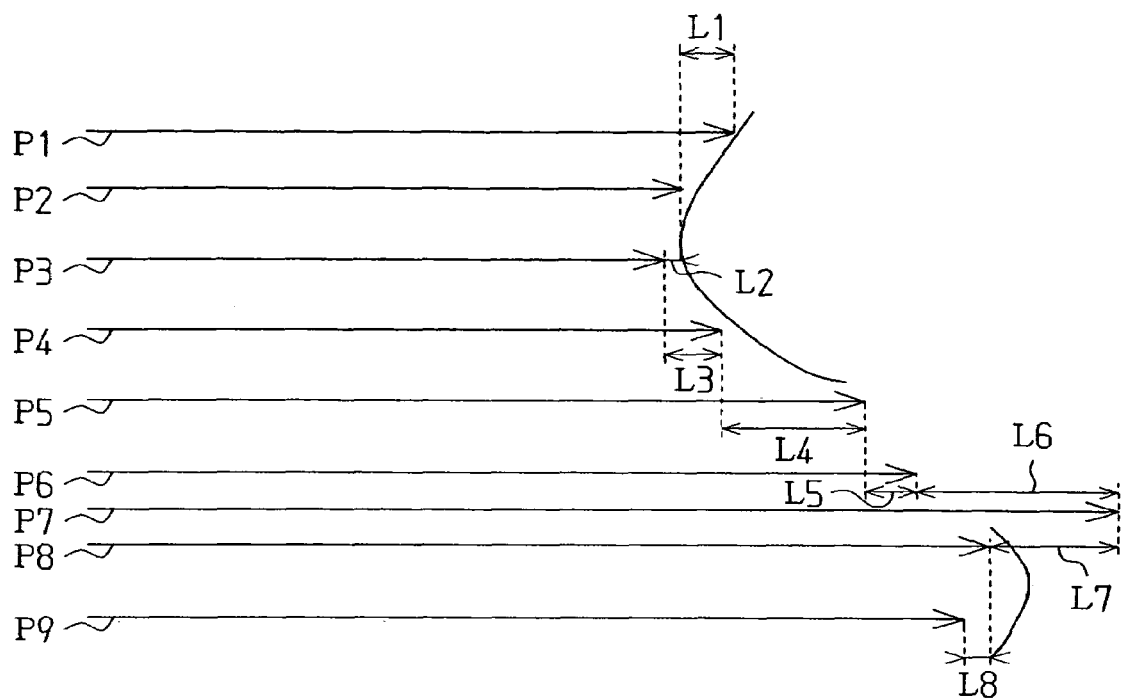
FIG. 7 is a schematic diagram illustrating the continuity of MIP positions.

For example, the form of the MIP positions stored in the MIP position grid storage unit PG may be expressed as shown in FIG. 7. FIG. 7 schematically shows a two-dimensional plan view of the form of the MIP positions of pixels P1 through P9 stored in the MIP position grid storage unit PG. The arrows extend from the foreside toward the father side from the viewers perspective, and longer arrows indicate MIP positions further toward the father side. For example, an internal organ or bone has a continuous form. Accordingly, when a voxel does not include noise, the form of the MIP positions, or the data of depth (distance), stored in the MIP position grid storage unit PG includes continuous values. When a voxel value of a voxel including noise is set as a MIP value, however, the pixels having projected MIP values that contain noise are MIP positions which are markedly different in comparison to adjacent MIP positions (hereinafter referred to as "adjacent MIP positions"). For example, when comparing pixel P6 and pixel P8, as shown in FIG. 7, pixel P7 has a markedly different MIP position, and the MIP position is positioned on the interior side at only one point of pixel P7. That is, only one point is positioned on the foreside, or father side, such that a non-continuous MIP image is formed. The MIP value corresponding to such a MIP position is discriminated as noise. A voxel V having a voxel value D discriminated as noise is labeled as a noise voxel NV, and the coordinates of the noise voxel NV are stored in the noise position list storage unit NL.

The noise position list storage unit NL stores the coordinates of the listed noise voxels NV. The coordinates of the noise voxels NV may also be stored as volume mask data, or information appended to the original voxel data VD. That is, the information as to whether or not a voxel V is noise can be appended as additional information to the voxel V included in the voxel data VD. When once labeled as noise, the noise-labeled voxel NV is excluded from the subject for which MIP positions are being calculated.

When determining the form of the MIP position in the previously mentioned noise discrimination process, the MIP positions may change markedly at the boundary of bone and organs, for example, regardless of the presence or absence of noise. As shown in FIG. 7, the difference in distance between the MIP position of pixel P4 and the MIP position of pixel P5 is relatively large. However, pixels P1 through P4 and pixels P5 and P6 are respectively consecutive, such that pixel P5 (voxel V of pixel P5) cannot be considered as noise. In order to avoid discriminating a voxel V as noise when it is not noise, a predetermined threshold value T is set. When the distance between a specific MIP position and the adjacent MIP positions is slightly larger in at least one case than the threshold value T, the voxel V of that MIP position is discriminated as noise.

The threshold value T may be changed according to the subject generating the MIP image. For example, when a CT image includes both bone and organs expressed as a MIP image, setting a comparatively large threshold value T will prevent discriminating the boundary between the bone and organ as noise. When only organs or only bone is included in a CT image expressed as a MIP image, a comparatively small threshold value T may be set.

As shown in FIG. 4, the program 9 executes the process number counter 9a through software. The process number counter 9a counts the number of executions of the noise discrimination process. Normally, some of the voxels V may include noise. Accordingly, in order to eliminate a plurality of noise N from the voxel data VD, it is necessary to perform the noise discrimination process a number of times. In order to smoothly display a MIP image, it is necessary to reduce the time required for the MIP image display. Therefore, the process number counter 9a counts the number of executions of the noise discrimination process, and when the noise discrimination process is executed a specific number of times, the noise discrimination processing ends even though voxels V containing noise N still remain within the voxel data VD.

The count value that ends the noise discrimination may be fixed at a predetermined value, or may change in accordance with the processed content. For example, the count value can be set low when a user wants to see an outline of the MIP image even though some noise N remains so as to reduce the time required for the noise discrimination process. Alternatively, the count value can be set high when a user wants to see a highly accurate MIP image even though a longer time is required, so as to repeat the noise discrimination process several times to remove a large amount of noise N.

As shown in FIG. 4, the computer 3 is provided with a graphics processing unit (GPU) 10. The GPU 10 is a graphics controller chip, which mainly supports a high performance three-dimensional graphics function and which performs high-speed two-dimensional and three-dimensional graphics drawing functions based on user specified programs. In the first embodiment, post processing is executed by the GPU 10. In this way, the time required to display a MIP image can be reduced.

In the post processing, color, contrast, and brightness are corrected to display the calculated MIP image on an output device such as the monitor 4. Since the output (e.g., CT image and MRI image) of many medical diagnostic devices a are 12-bit gradient data, the MIP image calculated by the MIP image calculation process (MIP values stored in the MIP value grid storage unit VG) is also 12-bit gradient data. However, the monitor 4 of the computer 3 often represents RGB colors as 8-bit data. Therefore, color, contrast, and brightness are converted for display on the monitor 4 by a window level (WL) transformation and color look-up table (LUT) transformation. Image data is also converted for display on the monitor 4 by aligning the size of the image to the screen using an affine transformation.

The MIP image calculation process executed by the image display device 1 is described below.

Figure 8:
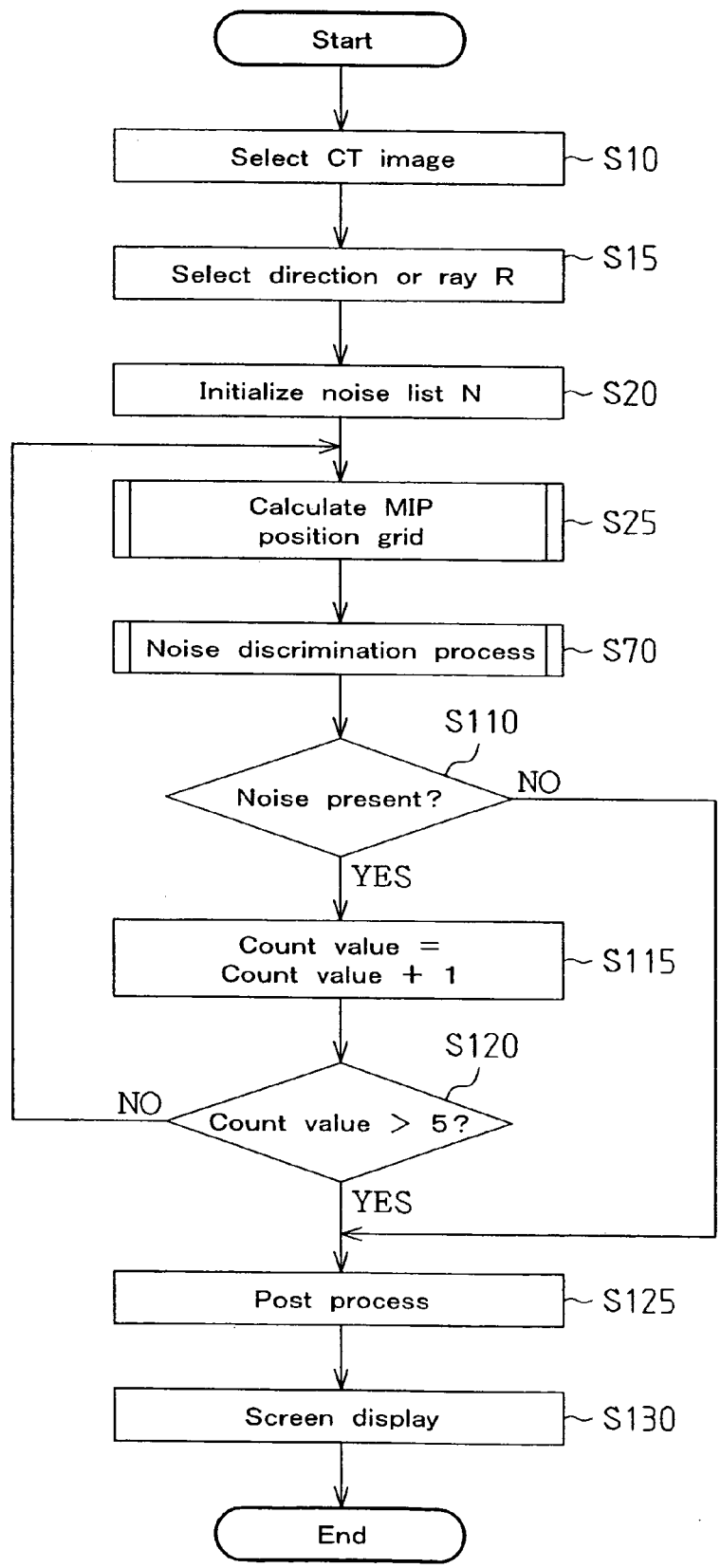
FIG. 8 is a flowchart of the MIP image calculation process.

FIG. 8 is a flowchart of the entire MIP image calculation process. A plurality of CT images are displayed on the screen 4a of the monitor 4 of the image display device 1. First, when a user wants to create a MIP image, a CT image used to prepare the MIP image is selected by operating the keyboard 5 and mouse 6 (step S10). Specifically, a CT image is constructed from a plurality of slice images, and the user designates the range desired for preparing the MIP image from among the slice images. Data of the designated slice images are stored in the memory 8a as voxel data VD. Then, the user selects the direction of the rays R (step S15). Specifically, the user sets the direction of the rays R by operating the mouse 6 according to the direction from which the user wants to view the image. Then, the CPU 7 initializes the noise position list storage unit NL (step S20).

Figure 9:
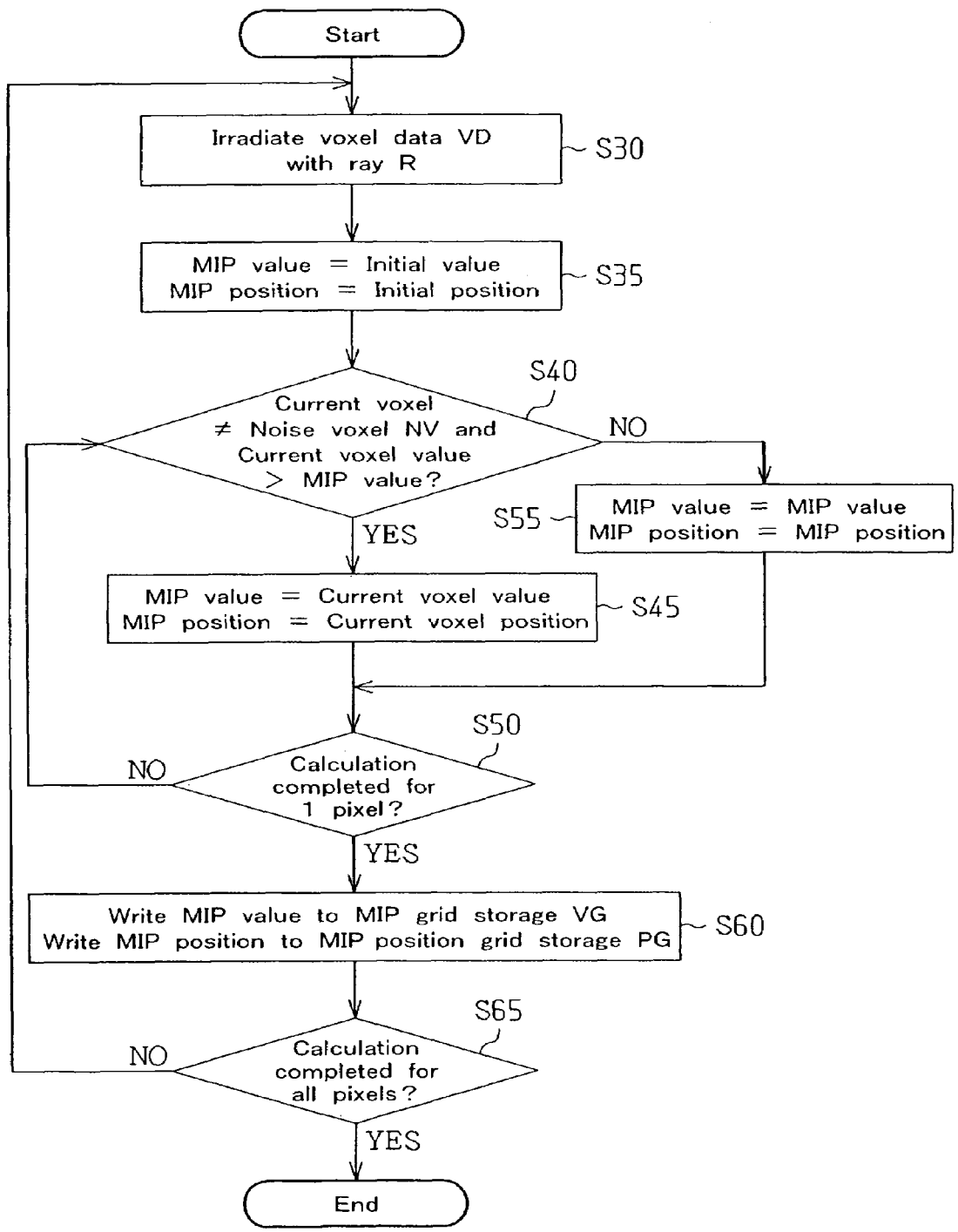
FIG. 9 is a flowchart illustrating a calculation process of a MIP position grid.
Figure 10:
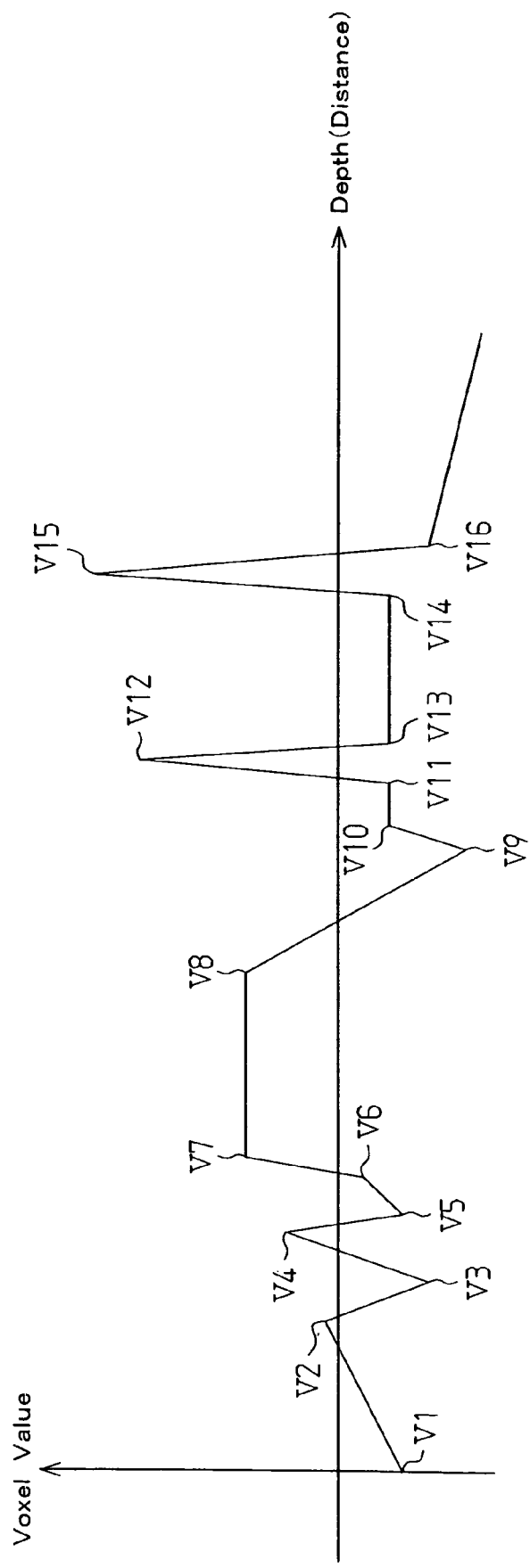
FIG. 10 is a schematic diagram illustrating the MIP value of one pixel.
Figure 11:
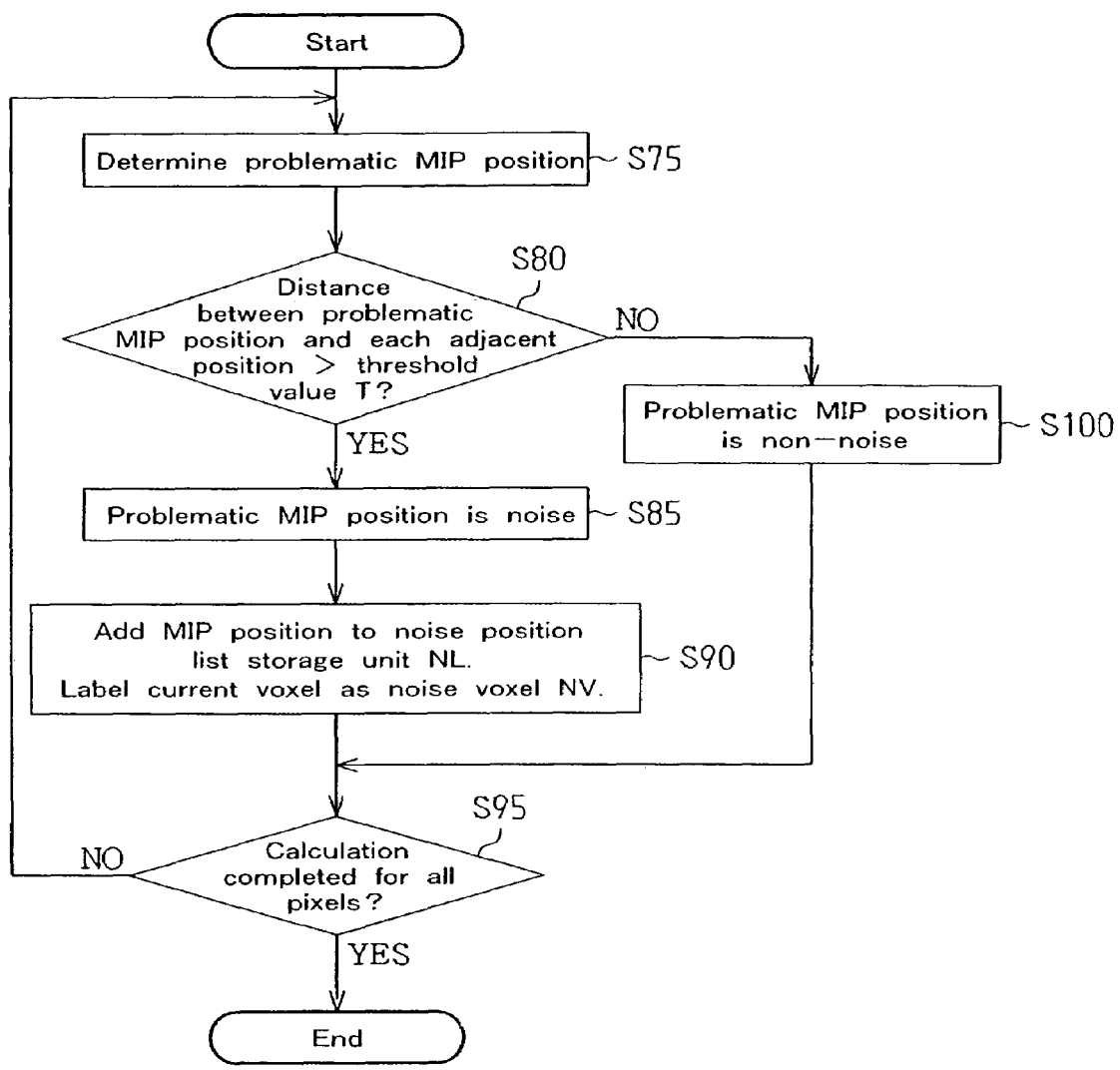
FIG. 11 is a flowchart illustrating a noise discrimination process.

Next, the CPU 7 executes the MIP position grid calculation (MIP position calculation process) (step S25). In the calculation of the MIP position grid, the CPU 7 executes the processes of steps S30 through S65 of FIG. 9 for each of pixels P1 through Pn. First, the CPU 7 reads the voxel data VD from the memory 8a, and irradiates the voxel data VD with the rays R in the selected direction (step S30). Then, the CPU 7 initializes the MIP value and MIP position (step S35). In the first embodiment, the CPU 7 sets the MIP value at −1000, and sets the MIP position at coordinates (0, 0, 0) during initialization. Then, the CPU 7 calculates the MIP position for voxels V1 through Vn through which the rays R pass. FIG. 10 shows the relationship of the voxel values in the depth direction when the rays R pass through voxels V1 through Vn. FIG. 10 shows voxels V1 to Vn through which a single ray R passes. The horizontal axis represents the distance in the depth direction, and the vertical axis represents the voxel value. In the first embodiment, sixteen voxels V1 through Vn are arranged from the foreside toward the inside. As shown in FIG. 9, the CPU 7 determines whether or not the current voxel value is greater than the MIP value without labeling the current voxel value as a noise voxel NV (step S40).

In an example, no data has been stored yet in the noise position list storage unit NL. Thus, the CPU 7 determines that the first voxel V1 disposed at the forefront, that is, the current voxel V1 is not labeled as a noise voxel NV. Since the MIP value is an initial value, the voxel value D1 of the current voxel value V1 is greater than the MIP value (step S40: YES). Accordingly, the current voxel value, that is, the voxel value D1 of the voxel V1, is set as the MIP value, and the coordinate (x1, y1, z1) of the voxel V1 are set as the MIP position (step S45). Then, the CPU 7 determines whether or not the MIP value has been calculated for all voxels of one pixel (step S50). Since the MIP value has been determined for only a single voxel V1 among the voxels of a single pixel (step S50: NO), the CPU 7 determines the next voxel V2.

The CPU 7 determines whether or not the current voxel value is greater than the MIP value without labeling the current voxel as a noise voxel NV (step S40). Since no data has yet been stored in the noise position list storage unit NL, the CPU 7 determines that the current voxel V2 is not labeled as a noise voxel NV. As shown in FIG. 10, the voxel value D2 of the current voxel V2 is greater than the voxel value D1 of the MIP value voxel V1 (step S40: YES). Accordingly, the MIP value is set to the voxel value D2 of the voxel V2, and the coordinate (x2, y2, z2) of the voxel V2 are set as the MIP position (step S45). Since the MIP value has been determined only for the second voxel V2 of a single pixel (step S50: NO), the CPU 7 determines the next voxel V3.

The CPU 7 determines whether or not the current voxel value of the third voxel V3 is greater than the MIP value and has not been labeled as a noise voxel NV (step S40). Since no data has as yet been stored in the noise position list storage unit NL, the CPU 7 determines that the current voxel V3 is not labeled as a noise voxel NV. As shown in FIG. 10, the voxel value D3 of the current voxel V3 is smaller than the voxel value D2 of the MIP value voxel V2 (step S40: NO). Accordingly, the MIP value and the MIP position are not updated (step S55). Since the MIP value has been determined only for the third voxel V3 of the voxels of a single pixel (step S50: NO), the CPU 7 determines the next voxel V4.

The CPU similarly makes determinations for the voxels V4 through V16. When determinations have been made for all of the sixteen voxels V1 through V16, the CPU 7 concludes that the determinations have ended for one pixel (step S50: YES). In this state, as shown in FIG. 10, the MIP value is voxel value D15 of the fifteenth voxel V15, and the MIP position is the coordinate (x15, y15, z15) of the voxel V15. The CPU 7 writes the MIP value of the voxel value D15 to the MIP value grid storage unit VG, and writes the MIP position (x15, y15, z15) to the MIP position grid storage unit PG (step S60). Thereafter, the CPU 7 checks whether or not the MIP position grid calculations have ended for all pixels (step S65). Since the MIP position grid calculations have not ended for one pixel at this time, the CPU 7 similarly executes the MIP position grid calculation for each pixel (steps S30 through S60). This process will not be described.

When determinations end for all pixels (step S65: YES), the CPU 7 executes the noise discrimination process (step S70), as shown in FIG. 8. In the noise discrimination process, the CPU 7 executes the processes of steps S75 through S100 shown in the flowchart of FIG. 11. First, the CPU 7 determines the problematic MIP positions which are the subject of the noise discrimination process (step S75). In the first embodiment, the respective MIP positions of pixels P1 through Pn corresponding to the image projected on the frame F are determined as problematic MIP positions in sequence from P1 to Pn. This sequence or another sequence may be used. For example, the reverse sequence (Pn, Pn−1, . . . P2, P1) may be used. The CPU 7 determines whether or not the distances between the problematic MIP position and adjacent MIP positions are greater than a threshold value T (step S80).

Specifically, the CPU 7 compares the specific MIP position to the adjacent MIP positions, and determines whether or not a non-continuous MIP position exists, as shown in FIG. 7. FIG. 7 schematically shows the depth information (distance) of pixels P1 through P9 among all pixels. The adjacent distance L1 represents the distance between the MIP position of the pixel P1 and the MIP position of the pixel P2. The adjacent distance L2 represents the distance between the MIP position of the pixel P2 and the MIP position of the pixel P3. Similarly, the adjacent distances L3 through L8 represent the distances between adjacent MIP positions. The CPU 7 compares each value of the adjacent distances L1 through L8 to the threshold value T. Hereinafter, the determination of the MIP position of the pixel P7 as the problematic MIP position will be described in detail. In one example, the adjacent distance L6 is 10 cm, and the threshold value T is 7 cm. In this case, since the adjacent distance L6 is larger than the threshold value T, pixel P7 is determined to be non-continuous (step S80: YES in FIG. 11). That is, the pixel P7 is discriminated as noise (step S85). The MIP position which is determined to be noise is added to the noise position list storage unit NL, and the voxel V (current voxel) of that MIP position is labeled as a noise voxel NV (step S90). In the first embodiment, when the voxel V of the MIP position of the pixel P7 is the fifteenth voxel V15 in FIG. 10, the voxel V15 is labeled as a noise voxel NV. The CPU 7 repeats the noise discrimination process in the same manner, and when determinations have been made for all pixels (step S95: YES), the noise discrimination process ends.

After the noise discrimination process ends, the CPU 7 determines whether or not there is noise in pixels P1 through Pn, as shown in FIG. 8 (step S110). The CPU 7 has executed the noise discrimination process only once, and noise N remains in pixel P7 (step S110: YES). Accordingly, the CPU 7 increments the count value of the process number counter 9a (step S115), and determines whether or not the count value exceeds 5 (step S120). At this time, the count value is still 1 (step S120: NO). The CPU 7 recalculates the MIP position of the pixel corresponding to the MIP position containing noise (step S25).

Then, the CPU 7 executes the MIP position grid calculation (steps S30 through S65), as shown in FIG. 9. Referring to FIG. 10, with regard to pixel P7, the voxels V1 through V14 are not labeled as noise voxels NV, and the twelfth voxel V12 has the maximum voxel value D12 among the voxels V1 through V14. Accordingly, after making the determinations of the voxels V1 through V14, the MIP value is set to voxel value D12, and the MIP position is set to the coordinate (x12, y12, z12) of the voxel V12. Next, the CPU 7 makes a determination for the fifteenth voxel V15. The voxel V15 is labeled as a noise voxel NV (step S40: NO). Accordingly, the MIP value remains as the voxel value D12 of voxel V12, and the MIP position remains as the coordinate of the voxel V12 (step S55). Next, the CPU 7 makes a determination for the sixteenth voxel V16. The voxel value D16 of the voxel V16 is less than the voxel value D12 of the voxel V12 (step S40: NO). Accordingly, the MIP value remains as the voxel value D12 of voxel V12, and the MIP position remains as the coordinate of the voxel V12 (step S55).

When the MIP position grid calculation ends for all voxels of one pixel (step S50: YES), the CPU 7 writes the MIP value to the MIP value grid storage unit VG, and writes the MIP position to the MIP position grid storage unit PG (step S60). Thereafter, the CPU 7 checks whether or not determinations have ended for all pixels (step S65).

Figure 12:
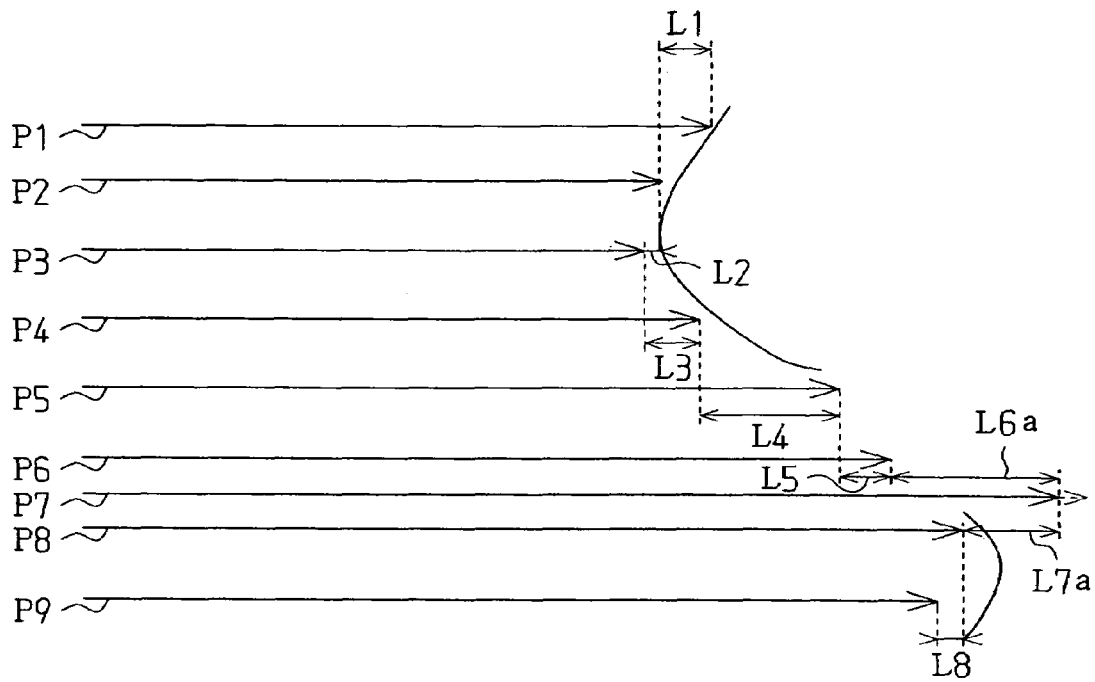
FIG. 12 is a schematic diagram illustrating the continuity of MIP positions.

When the determinations have ended for all pixels (step S65: YES), the CPU 7 again executes the noise discrimination process, as shown in FIG. 8 (step S70, namely steps S75 through S110 in FIG. 11). As shown in FIG. 12, the adjacent distance L6a between the MIP position of pixel P6 and the MIP position of pixel P7 is slightly less than the adjacent distance L6 (refer to FIG. 7). For example, the adjacent distance L6a is 8.5 cm, and the threshold value T is 7 cm. Since the adjacent distance L6a is greater than the threshold value T, the CPU 7 determines that the pixel P7 is non-continuous (step S80: YES in FIG. 11). That is, the voxel V12 is discriminated as noise (step S85). The MIP position determined to be noise is added to the noise position list storage unit NL, and the MIP position voxel V12 is labeled as a noise voxel NV (step S90).

When determinations end for all pixels (step S95: YES), the CPU 7 checks whether or not there is noise in any of the pixels P1 through Pn (step S110 in FIG. 8). Since noise still remains in pixel P7 (step S110: YES), the CPU 7 increments the count value of the process number counter 9a (step S115). Then, the CPU 7 checks whether or not the count value exceeds 5 (step S120). Since the count value is 2 at this time (step S120: NO), the CPU 7 recalculates the MIP position grid for the pixel corresponding to the MIP position of the noise (step S25).

As shown in FIG. 9, the CPU 7 executes the MIP position grid calculation (steps S30 through S65). Referring to FIG. 10, the new MIP value is set to voxel value D7 of the seventh voxel V7, and the new MIP position is set to the voxel V7 coordinates (x7, y7, z7). Then, the CPU 7 writes the MIP value to the MIP value grid storage unit VG, and writes the MIP position to the MIP position grid storage unit PG (step S60 in FIG. 9). Since the voxel V12 and voxel V15 have been labeled as noise voxels NV at this time (step S40: NO), they are removed from the MIP position grid calculation subjects.

In the first embodiment described above, when the current voxel value is greater than the MIP value, the current voxel value is set as the MIP value (refer to step S40). That is, when two voxels have identical voxel values, the voxel value of the voxel disposed to the foreside (near the origin of the ray R) is set as the MIP value. Accordingly, although the voxel value D7 of the voxel V7, for example, is equal to the voxel value D8 of the voxel V8, the MIP value is set to the voxel value D7 of the voxel V7, as shown in FIG. 10. Alternatively, when, for example, a plurality of voxels V have maximum voxel values, the voxel value of the voxel disposed farthest from the viewing point may be set as the MIP value, or the voxel value of the second or third voxel from the viewing point may be set as the MIP value. That is, the voxel value of any individual voxel among the plurality of voxels V1 through Vn having maximum voxel values may be set as the MIP value.

Figure 13:
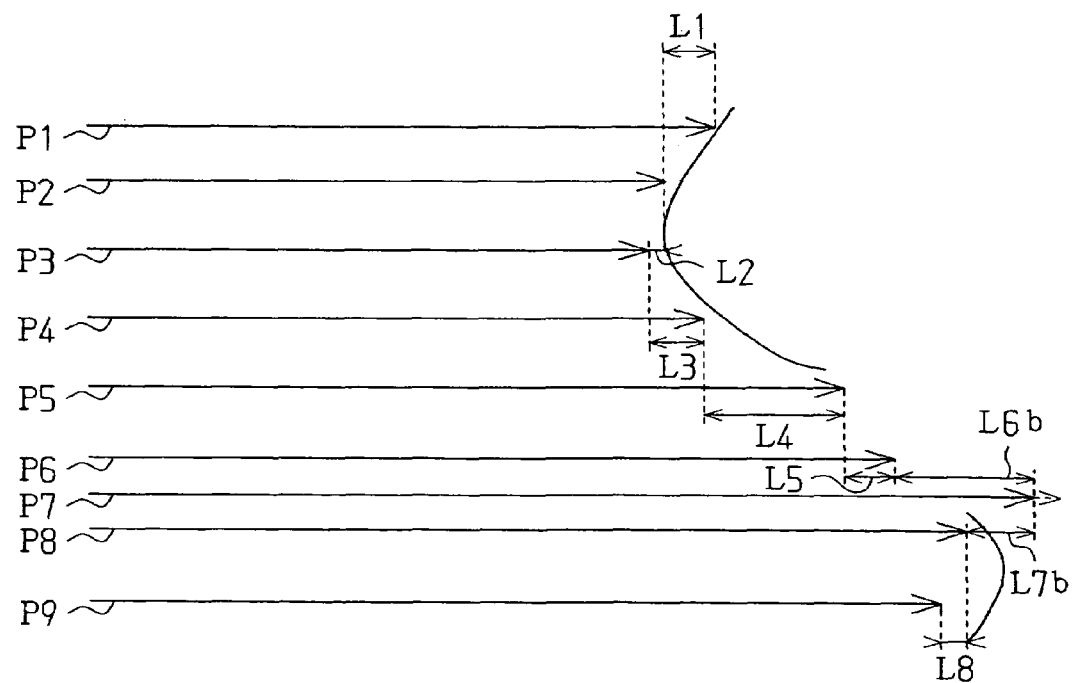
FIG. 13 is a schematic diagram illustrating the continuity of MIP positions.

When the determinations end for all pixels (step S65: YES in FIG. 7), the CPU 7 executes the noise discrimination process (step S70 in FIG. 8, and steps S75 through S100 in FIG. 11). Referring to FIG. 13, the adjacent distance L6b between the MIP position of pixel P6 and the MIP position of pixel P7 is 6 cm, and the threshold value T is 7 cm. Accordingly, the distance between the problematic MIP position and the adjacent MIP position is less than the threshold value T (step S80: NO). Therefore, the voxel of the problematic MIP position, that is, the voxel V7, is not discriminated as noise (step S100). Similarly, the CPU 7 determines whether or not noise is contained for every one of the pixels (steps S75 through S100).

Figure 2:
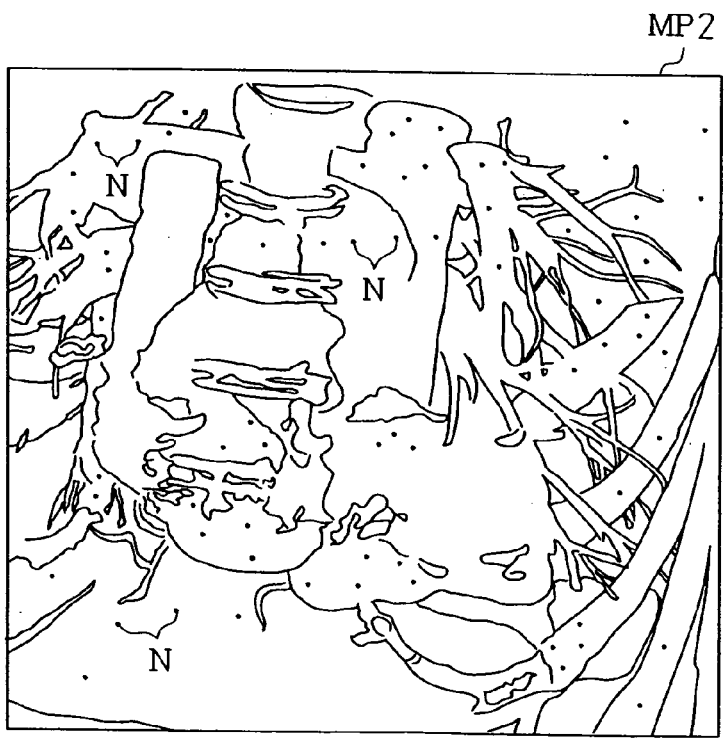
FIG. 2 is a schematic diagram of a conventional MIP image.

After the MIP position grid is calculated for all pixels (step S95: YES), the CPU 7 determines whether or not there is noise in the pixels (step S110 in FIG. 8). Since no noise remains at this time (step S110: NO), the MIP values stored in the MIP value grid storage unit VG, that is, the MIP image, are subjected to post processing by the GPU 10 (step S125). When post processing ends, the display device 1 displays the MIP image on the monitor 4 (step S130). As described above, the noise is removed from the MIP values stored in the MIP value grid storage unit VG. Accordingly, the display device 1 displays a clear MIP image MP1 as shown in FIG. 2 on the monitor 4.

The MIP positions of the MIP values that substantially do not contain noise after the noise discrimination process are stored in the MIP position grid storage unit PG. Since the MIP position grid storage unit PG is a memory region for storing depth information (distance), it can be used to extract image regions similar to a Z-buffer. For example, when the MIP position of the MIP image of a bone is stored in the MIP position grid storage unit PG, the image display device 1 can extract only the bone data of the MIP position grid storage unit PG from the voxel data VD so as to redisplay the MIP image containing the bone, or to display the MIP image including only organs and excluding the bone. A desired region can be accurately extracted because the noise has been removed from the MIP positions stored in the MIP position grid storage unit PG after the MIP image calculation process.

The voxels V including noise are stored in the noise position list storage unit NL as noise voxels NV. Since the noise position list storage unit NL holds the list of the noise voxels NV and is not initialized each time the MIP image calculation process is executed, the time required for eliminating the noise is reduced. That is, the voxels V stored in the noise position list storage unit NL are labeled noise voxels NV and eliminated from the MIP position calculation subjects even when the ray direction is changed, or when the number of selected CT images changes and the magnitude of the voxel data VD changes. As a result, the time required for noise elimination is reduced, and the time required for the MIP image calculation and display is also reduced.

The image display device 1 of the first embodiment has the advantages described below.

(1) The image display device 1 stores in the MIP position grid storage unit PG the coordinate (MIP position) of the voxel V having a voxel value D set as the MIP value during the calculation of the MIP image. When the distance between a problematic MIP position and its adjacent MIP position is greater than a threshold value T, the image display device 1 determines that the problematic MIP position is non-continuous, and the problematic MIP position is discriminated as noise. Accordingly, noise positions included in voxel data VD can be determined based on the continuity of the MIP positions stored in the MIP position grid storage unit PG even as the MIP image is being calculated.

(2) The voxel V discriminated as noise is labeled as a noise voxel NV, and the position of the noise voxel NV is stored in the noise position list storage unit NL. The noise voxel NV is eliminated from the MIP image calculation subject. As a result, noise included in MIP images is reduced.

(3) The noise positions are stored in the noise position list storage unit NL. When the direction of the rays R changes, or the magnitude of the voxel data VD changes due to a change in the number of selected CT images, the voxels V which have been labeled as noise voxels NV are eliminated from the MIP image calculation subject. Accordingly, the time required for calculation of the MIP image is shortened, and noise is reduced.

(4) The image display device 1 eliminates noise N as the MIP image is calculated, and stores the MIP position of the eliminated noise in the MIP position grid storage unit PG.

Accordingly, the image display device 1 can use the MIP positions stored in the MIP position grid storage unit PG after noise removal for region extraction.

Second Embodiment

In the first embodiment, the MIP image calculation process is executed by a single computer 3, such as a single workstation or the like. However, in the second embodiment, a plurality of computers operate in a distributed process to perform at least a single process among a plurality of processes included a MIP image calculation process.

Figure 14:
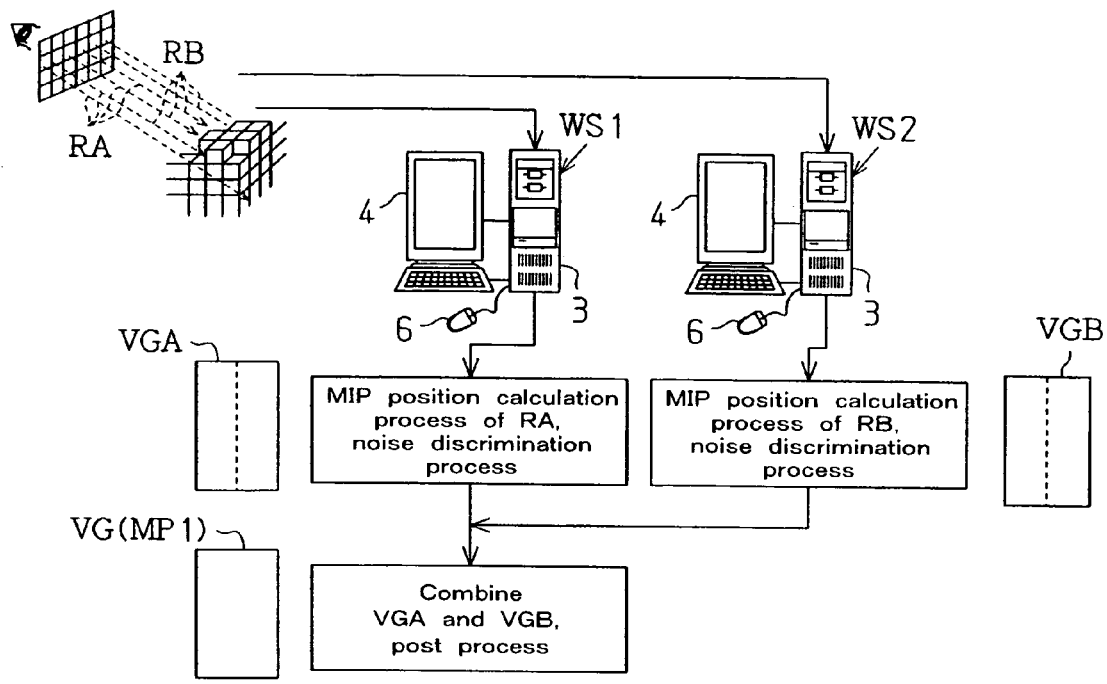
FIG. 14 is a block diagram showing a dispersion process of an MIP image calculation process in a first example of a second embodiment of the present invention.
Figure 15:
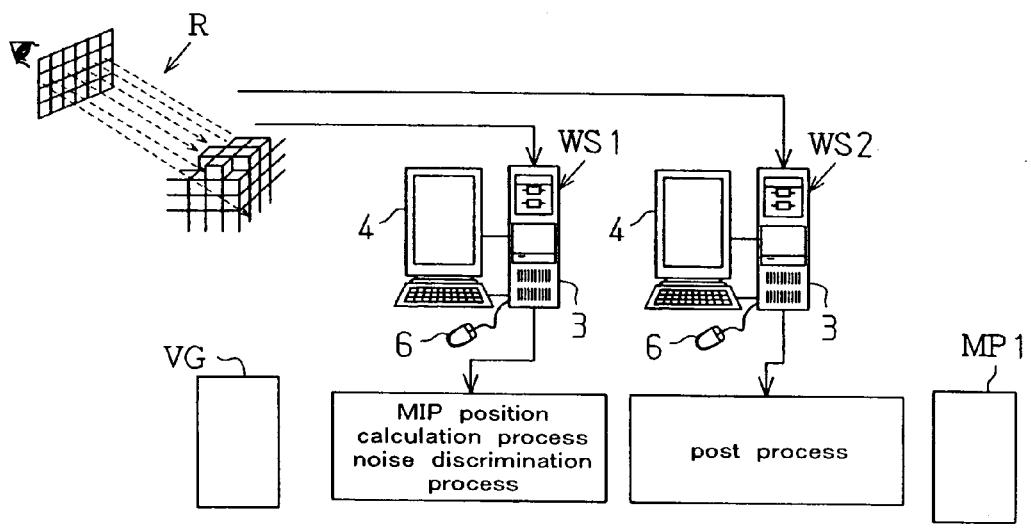
FIG. 15 is a block diagram showing a dispersion process of a MIP image calculation process in a second example of a second embodiment of the present invention.
Figure 16:
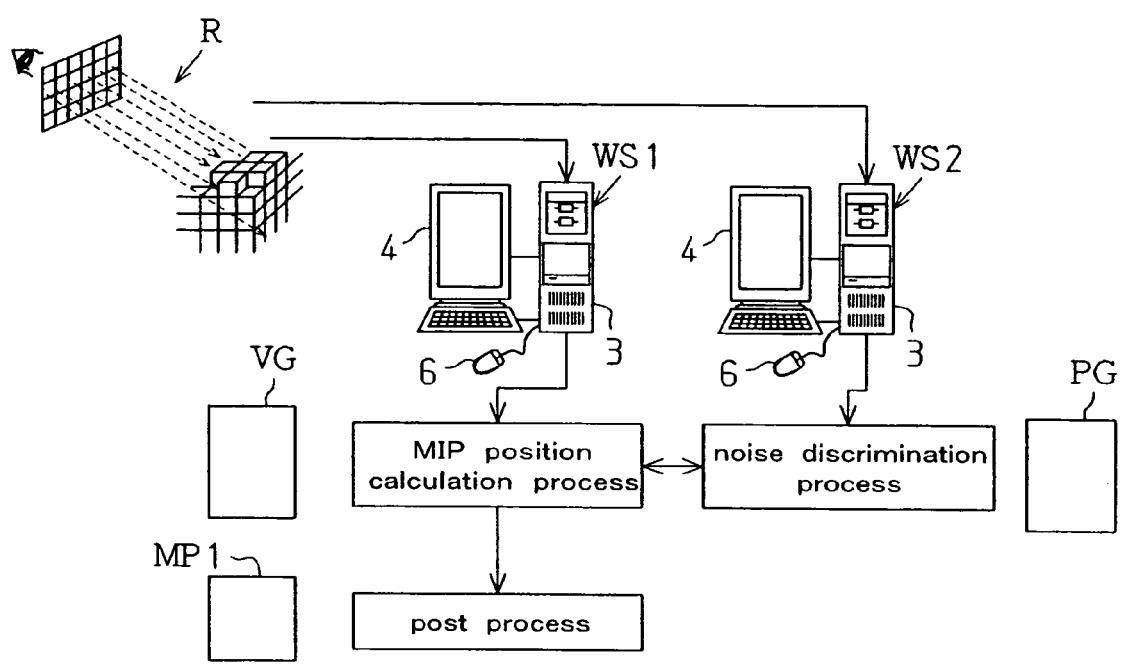
FIG. 16 is a block diagram showing a dispersion process of a MIP image calculation process in a third example of a second embodiment of the present invention.

For example, in an in-hospital network to which a plurality of workstations are connected, at least one process may be distributed to a plurality of workstations to execute the process. Described below are three examples of the distributed execution of the MIP image calculation process. In a first example, the processing for a plurality of rays is divided. In a second example, only the post processing is separated from the MIP image calculation process. In a third example, the MIP image calculation process and noise discrimination process are divided. To facilitate the following discussion, the examples are discussed in terms of two workstations WS1 and WS2 creating a 512×512 image, as shown in FIGS. 14 through 16. Alternatively, the process of creating the image may be distributed to three or more workstations. In the second embodiment, one of the workstations WS1 and WS2 is provided with a GPU 10.

EXAMPLE 1

In example, 1, rays R are divided into rays RA (rays R1 through Rk) and rays RB (rays Rk+1 through Rn), as shown in FIG. 14. Rays RA pass through voxels V1 through Vk. Rays RB pass through voxels Vk+1 through Vn. The rays R are divided such that some of the voxel data VD overlap in rays RA and RB and the rays RA and rays RB have redundancy. This redundancy is necessary because when the rays RA and RB do not reach a point on the grid, the surrounding voxels are required for interpolation of the voxel value D and for comparison of the problematic MIP position and adjacent MIP position in the noise discrimination process. In this case, each workstation WS1 and WS2 performs the MIP position calculation process and the noise discrimination process. In this configuration, the memory capacity and transfer amount of the MIP value grid storage unit VG and the MIP position grid storage unit PG in each workstation is only one half the entire MIP image. The processing procedures will now be described.

(1-1) The workstation WS1 subjects the voxel data VD on rays RA (voxels V1 through Vk) to the MIP position calculation process and noise discrimination process. Then, the workstation WS1 determines the MIP values, the MIP positions, and noise voxels NV, and stores these MIP values, MIP positions, and the noise voxels NV in the respective MIP value grid storage unit VGA, the MIP position grid storage unit PGA, and the noise position list storage unit NLA. Similarly, the workstation WS2 subjects the voxel data VD on rays RB (voxels Vk+1 through Vn) to the MIP position calculation process and noise discrimination process. Then, the workstation WS2 determines the MIP values, MIP positions, and noise voxels NV, and stores these MIP values, MIP positions, and noise voxels NV in the respective MIP value grid storage unit VGB, MIP position grid storage unit PGB, and noise position list storage unit NLB.

(1-2) The workstation WS2 transfers the MIP values, MIP positions, and noise voxels NV respectively stored in the MIP value grid storage unit VGB, the MIP position grid storage unit PGB, and the noise position list storage unit NLB to the workstation WS1. The size of the transfer at this time is 512×256.

(1-3) In conjunction with the data transfer from the workstation WS2 to the workstation WS1, the workstation WS1 stores the synthesized MIP values including both the MIP values of the rays RA and the MIP values of the rays RB in the MIP value grid storage unit VG. The workstation WS1 subjects the synthesized MIP values stored in the MIP value grid storage unit VG to post processing, and obtains a MIP image MP1 from which noise N has been eliminated.

EXAMPLE 2

In example 2, the post processing is separated from the MIP image calculation process. As shown in FIG. 15, the workstation WS1 executes the MIP position calculation process and noise discrimination process for all voxel data VD. Post processing is executed by the workstation WS2 which is provided with a GPU 10 suitable for high-speed image processing. In this configuration, the time required for post processing is reduced. The processing procedure will now be described.

(2-1) The workstation WS1 executes the MIP position calculation process and noise discrimination process for the voxel data VD on the rays R. Then, the MIP values, MIP positions, and noise voxels NV are determined, and these MIP values, MIP positions, and noise voxels NV are respectively stored in the MIP value grid storage unit VG, the MIP position grid storage unit PG, and the noise position list storage unit NL.

(2-2) The workstations WS1 transfers the MIP values, MIP positions, and noise voxels NV respectively stored in the MIP value grid storage unit VG, the MIP position grid storage unit PG, and the noise position list storage unit NL to the workstation WS2. The size of the transfer at this time is 512×512.

(2-3) The workstation WS2 subjects the MIP values stored in the MIP value grid storage unit VG to post processing, and obtains a MIP image from which noise has been eliminated.

EXAMPLE 3

In example 3, the MIP position calculation process and the noise discrimination process are divided. As shown in FIG. 16, data is transferred several times between the workstations WS1 and WS2. However, since the MIP position calculation process and the noise discrimination process are performed in parallel, the overall processing speed is improved. The MIP positions are stored in the MIP position grid storage unit PG of the workstation WS2.

(3-1) The workstation WS1 executes the MIP position calculation process for the voxel data VD on the rays R. When the MIP positions have been calculated for each pixel, the workstation WS1 transfers the MIP positions to the workstations WS2. Each MIP position is stored in the MIP position grid storage unit PG of the workstation WS2.

(3-2) While the workstation WS1 is executing the MIP position calculation process, the workstation WS2 executes the noise discrimination process. When the voxels containing noise have been determined in the noise discrimination process, the workstation WS2 has the workstation WS1 execute the MIP position calculation process again for pixels which contain noise.

(3-3) The workstation WS1 executes post processing for the MIP values stored in the MIP value grid storage unit VG after the workstation WS2 has executed the noise discrimination process a certain number of times, and obtains a MIP image MP1 from which noise has been removed. The overall processing speed is improved by having the post processing executed by the workstation WS2 which is provided with the GPU 10.

In addition to the advantages of the first embodiment, the second embodiment has the advantages described below.

(1) The speed of the MIP image calculation process is improved by the distributed processing performed by a plurality of computers 3. For example, the MIP image MP1 is immediately displayed on the monitor 4, easily ensuring the real time quality of the MIP image MP1.

(2) Since distributed processing is performed by a plurality of computers 3, there is reduced memory usage for the MIP value grid storage unit VG, the MIP position grid storage unit PG, and the noise position list storage unit NL.

It should be apparent to those skilled in the art that the present invention may be embodied in many other specific forms without departing from the spirit or scope of the invention. Particularly, it should be understood that the present invention may be embodied in the following forms.

In the second embodiment, the networked workstations WS1 and WS2 perform network-distributed processing. Alternatively, distributed processing may be performed by a single workstation which is provided with a plurality of processors.

In each of the above embodiments, three-dimensional image data is subjected to the MIP image calculation process. Alternatively, image data having four or more dimensions, such as four-dimensional image data, may be subjected to the MIP image calculation process.

In each of the above embodiments, a MIP method is used to project three-dimensional image data on a two-dimensional frame. However, other methods may be used to project three-dimensional image data on a two-dimensional frame. For example, the minimum intensity projection (MinIP) method may be used to project the minimum values of voxel values D of the voxels V through which the rays R pass onto a two-dimensional frame F. In brief, usable methods are those which project specific voxel values D of a single voxel among voxel values D of the voxels that the rays R pass through. For example, the second smallest voxel value among the voxel values D of voxels that the rays R pass through, or voxel values having the maximum gradient among the voxel values D of voxels V that the rays R pass through, may be projected.

In the above embodiments, the problematic MIP position is discriminated as noise when the distance between the problematic MIP position and an adjacent MIP position is greater than a threshold value T. Alternatively, the noise position may be determined based on the positional relationship (front, back) of the problematic MIP position and the adjacent MIP position. For example, when only one point among adjacent MIP positions is positioned farther in the depth direction from the problematic MIP position, the MIP position of that one point may be discriminated as noise.

In the above embodiments, a problematic MIP position is discriminated as noise when the distance between the problematic MIP position and an adjacent MIP position is greater than a threshold value T. Alternatively, noise position discrimination may be based on the distance between a problematic MIP position and a MIP position near the problematic MIP position (hereinafter referred to as "proximal MIP position") rather than an adjacent MIP position. Furthermore, noise position discrimination may be based on the positional relationship between the proximal MIP position and the problematic MIP position, or based on the continuity of the proximal MIP position and the problematic MIP position.

In the above embodiments, when the distance between a problematic MIP position and an adjacent MIP position is greater than the threshold value T, the problematic MIP position is non-continuous and discriminated as noise. Alternatively, the continuity of a MIP position may be determined by using a threshold value T relative to a derivative (first derivative, second derivative or the like) of the distance between the problematic MIP position and a proximal MIP position. As another alternative, continuity may be determined based on a MIP position weighed for a specific directional component. The continuity may also be determined using a threshold value T relative to the proximal MIP position to which is added a component calculated from the distance from the viewpoint (frame F). Continuity may also be determined by using a threshold value T relative to a proximal MIP position to which is added a component calculated from the distance from a predetermined position. Continuity may further be determined using a threshold value T relative to the distance between a problematic MIP position and an average position of the proximal MIP positions. Continuity may also be determined using a threshold value T relative to scattered values of the distance between a problematic MIP position and proximal MIP positions. Continuity of MIP positions may also be determined based on a composite determination standard combining these determination standards.

In the above embodiments, a problematic MIP position is discriminated as noise when the distance between the problematic MIP position and an adjacent MIP position is greater than a threshold value T. Alternatively, a noise position may be discriminated based on the distribution of MIP values. For example, when MIP values are CT values, the MIP values representing specific tissues (bone, blood vessels, and organs) are within fixed ranges. That is, a specific MIP value (hereinafter referred to as "problematic MIP value") may not differ greatly from MIP values adjacent (hereinafter referred to as "adjacent MIP values") to the problematic MIP value. Accordingly, problematic MIP values which differ markedly from adjacent MIP values may be discriminated as noise.

In the above embodiments, a problematic MIP position is discriminated as noise when the problematic MIP position and the adjacent MIP position are non-continuous. Alternatively, noise positions may be determined based on both the continuity of the problematic MIP position and the adjacent MIP position (or proximal MIP position), and the continuity of the problematic MIP value and the adjacent MIP value (or proximal MIP value). In this way, noise positions are discriminated more accurately.

In the above embodiments, a problematic MIP position is discriminated as noise when the distance between the problematic MIP position and an adjacent MIP position is greater than a threshold value T. Alternatively, a noise position may be discriminated based on the continuity of MIP values. For example, MIP value continuity may be determined using a threshold value T relative to the difference between the MIP value and a predetermined value. Continuity of a MIP value can be determined using a threshold value T relative to a derivative (first derivative, second derivative or the like) of the difference between the problematic MIP value and a proximal MIP value (hereinafter referred to as "proximal MIP value") of the problematic MIP value. Continuity may also be determined based on a MIP value to which a coefficient associated with the MIP position is added. Continuity may also be determined by using a threshold value T relative to a proximal MIP value to which is added a component calculated from the distance from a viewpoint (frame F) or the distance from a predetermined position. Continuity may also be determined using a threshold value T relative to the difference between a problematic MIP value and an average value of the proximal MIP values. Continuity may also be determined using a threshold value T relative to scattered values of the proximal MIP values. Continuity of MIP values may also be determined based on a composite determination standard combining these determination standards.

In the above embodiments, noise positions are discriminated from the MIP positions stored in MIP position grid storage unit PG, and the noise MIP positions are eliminated from the MIP position grid storage unit PG. Alternatively, the noise voxels NV may be removed from the CT image data (voxel data VD) stored in the database 2 or hard disk. The elimination of the noise voxels NV may be accomplished by, for example, inserting information representing null data in the noise voxel NV of the voxel data VD. In this case, no calculation is carried out with regard to the noise voxels NV having null data information. Alternatively, the elimination of noise voxels NV may be accomplished by inserting a value (for example, a median value or interpolation value) calculated from a near voxel V in the noise voxel NV of the voxel data VD. In this case, a noise voxel NV to which is inserted a value calculated from a near voxel V is discriminated as non-noise. The time required for the noise discrimination process is reduced when, for example, the direction of the rays R changes and then the MIP image MP1 is recalculated due to the elimination of the noise voxels NV. As a result, the time required for the MIP image calculation process is reduced. Therefore, the MIP image MP1 is immediately displayed on the monitor 4, and the real time quality of the MIP image MP1 is readily ensured.

In the above embodiments, the CT images of part of a human body, such as bone or internal organs, are subjected to the MIP image calculation process. However, subjects included in the image are not limited to tissue of living organisms such as the human body, animals, or plants and the like as long as CT imaging is enabled. For example, the present invention is applicable to geological surveys, mining surveys, structural elements of machinery or various types of devices, image processing for viewing patterns of electrical circuits, LSI problem diagnosis, and the like.

The present examples and embodiments are to be considered as illustrative and not restrictive, and the invention is not to be limited to the details given herein, but may be modified within the scope and equivalence of the appended claims.

What is claimed is:

1. A method for generating a projection image projected on a two-dimensional frame from image data of three or more dimensions that includes a plurality of first pixels of three or more dimensions, wherein each first pixel has a value and a coordinate, and the projection image includes a plurality of second pixels, the method comprising:

setting a plurality of rays that pass through some of the first pixels, with each ray corresponding to one of the second pixels;

selecting one of the first pixels existing on each of the rays;

storing a value of the selected first pixel as a first value for each selected first pixel;

storing a coordinate of the selected first pixel as a first coordinate for each selected first pixel; and determining a noise position in a plurality of selected first pixels based on the first coordinate for each selected first pixel, wherein said determining a noise position includes determining a stored coordinate of a selected first pixel associated with a certain ray as a noise position when the distance between the stored coordinate of the selected first pixel associated with the certain ray and a stored coordinate of a selected first pixel associated with a ray near the certain ray is greater than a predetermined threshold value.

2. The method of claim 1, further comprising:

secondly selecting one of the first pixels existing on the ray but not including a noise position for each ray;

storing a value of the secondly selected first pixel as a second value for each secondly selected first pixel after said determining a noise position;

storing a coordinate of the secondly selected first pixel as a second coordinate for each secondly selected first pixel;

re-determining noise positions based on the second coordinate for each secondly selected first pixel; and processing the second value for each secondly selected first pixel to generate the projection image.

3. The method of claim 2, further comprising repeating said storing a second value, said storing of a second coordinate, and re-determining a noise position.

4. The method of claim 2 further comprising:

using the second coordinate for each secondly selected first pixel to extract an image region.

5. The method of claim 2, wherein said storing a first coordinate includes storing the first coordinate in a Z-buffer for each selected first pixel, and said storing a second coordinate includes storing the second coordinate in the Z-buffer for each secondly selected first pixel.

6. The method of claim 1, wherein said determining a noise position includes determining a noise position based on continuity of at least either one of the first value for each selected first pixel and the first coordinate for each selected first pixel over a plurality of the rays.

7. The method of claim 1, wherein said determining a noise position includes correcting the image data of three or more dimensions, and storing the image data of three or more dimensions, including a plurality of selected first pixels, excluding those in which the noise position exist.

8. The method of claim 1, wherein said selecting one of the first pixels includes selecting one of the first pixels having a maximum value for each ray.

9. The method of claim 1, wherein said selecting one of the first pixels includes selecting one of the first pixels having a minimum value for each ray.

10. A method for generating a projection image projected on a two-dimensional frame from image data of three or more dimensions that includes a plurality of first pixels of three or more dimensions, wherein each first pixel has a value and a coordinate, and the projection image includes a plurality of second pixels, the method comprising:

setting a plurality of rays that pass through some of the first pixels, with each ray corresponding to one of the second pixels;

selecting one of the first pixels existing on each of the rays for each ray;

storing a coordinate of the selected first pixel for each selected first pixel;

comparing the coordinate corresponding to a certain ray with the coordinate corresponding to another one of the rays;

determining a noise position in a plurality of selected first pixels when the distance between the coordinate corresponding to the certain ray and the coordinate corresponding to the another one of the rays is greater than a predetermined threshold value;

updating a plurality of stored coordinates with the coordinates associated with the selected first pixels that do not include a noise position; and generating a projection image based on the stored coordinates and the values corresponding to the stored coordinates.

11. The method of claim 10, further comprising:
repeating said comparing, said determining a noise position, and said updating coordinates until noise is eliminated from the selected first pixels existing on each ray or until the number of times said determining a noise position is performed reaches a predetermined number.

12. A computer program product comprising a computer-readable medium on which a program is recorded for generating a projection image projected on a two-dimensional frame from image data of three or more dimensions that includes a plurality of first pixels of three or more dimensions, wherein each first pixel has a coordinate and a value, and the projection image includes a plurality of second pixels, the program when executed by at least one computer performs steps including:
setting a plurality of rays that pass through some of the first pixels, with each ray corresponding to one of the second pixels;
selecting one of the first pixels existing on each of the rays for each ray;
storing a value of the selected first pixel as a first value for each selected first pixel;
storing a coordinate of the selected first pixel as a first coordinate for each selected first pixel; and
determining a noise position in a plurality of selected first pixels based on the first coordinate for each selected first pixel,
wherein said determining a noise position includes determining a stored coordinate of a selected first pixel associated with a certain ray as a noise position when the distance between the stored coordinate of the selected first pixel associated with the certain ray and a stored coordinate of a selected first pixel associated with a ray near the certain ray is greater than a predetermined threshold value.

13. The computer program product of claim 12, wherein the program when executed by at least one computer further performs steps including:
secondly selecting one of the first pixels existing on the ray but not including a noise position for each ray;
storing a value of the secondly selected first pixel as a second value for each secondly selected first pixel after said determining a noise position;
storing values a coordinate of the secondly selected first pixel as a second coordinate for each secondly selected first pixel;
re-determining a noise position based on the second coordinate for each secondly selected first pixel; and
processing the second value for each secondly selected first pixel to generate the projection image.

14. The computer program product of claim 13, wherein the program when executed by at least one computer further performs the step including:
repeating said storing a second value, said storing of a second coordinate, and re-determining a noise position.

15. The computer program product of claim 13, wherein the program when executed by at least one computer further performs the step including:
using the second coordinate for each secondly selected first pixel to extract an image region.

16. The computer program product of claim 13, wherein said storing a first coordinate includes storing the first coordinate in a Z-buffer for each selected first pixel, and said storing a second coordinate includes storing the second coordinate in the Z-buffer for each secondly selected first pixel.

17. The computer program product of claim 12, wherein said determining a noise position includes determining a noise position based on continuity of at least either one of the first value for each selected first pixel and the first coordinate for each selected first pixel over the rays.

18. The computer program product of claim 12, wherein said determining a noise position includes correcting the image data of three or more dimensions, and storing the image data of three or more dimensions, including the selected first pixels, excluding those in which the noise position exist.

19. The computer program product of claim 12, wherein said selecting one of the first pixels includes selecting one of the first pixels having a maximum value for each ray.

20. The computer program product of claim 12, wherein said selecting one of the first pixels includes selecting one of the first pixels having a minimum value for each ray.

21. A computer program product comprising a computer-readable medium on which a program is recorded for generating a projection image projected on a two-dimensional frame from image data of three or more dimensions that includes a plurality of first pixels of three or more dimensions, wherein each first pixel has a coordinate and a value, and the projection image includes a plurality of second pixels, the program when executed by at least one computer performs steps including:
setting a plurality of rays that pass through some of the first pixels, with each ray corresponding to one of the second pixels;
selecting one of the first pixels existing on each of the rays for each ray;
storing a coordinate of the selected first pixel for each selected first pixel;
comparing the coordinate corresponding to a certain ray with the coordinate corresponding to another one of the rays;
determining a noise position in a plurality of selected first pixels when the distance between the coordinate corresponding to the certain ray and the coordinate corresponding to the another one of the rays is greater than a predetermined threshold value;
updating a plurality of the stored coordinates with the coordinates associated with the selected first pixels that do not include a noise position; and
generating a projection image based on the stored coordinates and the values corresponding to the stored coordinates.

22. The computer program product of claim 21, wherein the program when executed by at least one computer further performs the step including:
repeating said comparing, said determining a noise position, and said updating coordinates until noise is eliminated from the selected first pixels existing on each ray or until the number of times said determining a noise position is performed reaches a predetermined number.

23. A device for generating a projection image projected on a two-dimensional frame from image data of three or more dimensions that includes a plurality of first pixels of three or more dimensions, wherein each first pixel has a value and a coordinate, and the projection image includes a plurality of second pixels, the device comprising:
a ray setting means for setting a plurality of rays that pass through some of the first pixels, with each ray corresponding to one of the second pixels;

a selecting means for selecting one of the first pixels existing on each of the rays for each ray;

a value storing means for storing a value of the selected first pixel as a first value for each selected pixel;

a coordinate storing means for storing a coordinate of the selected first pixel as a first coordinate for each selected first pixel; and a noise determining means for determining a noise position in a plurality of selected first pixels based on the first coordinate for each selected first pixel, wherein said noise determining means determines a stored coordinate of a selected first pixel associated with a certain ray as a noise position when the distance between the stored coordinate of the selected first pixel associated with the certain ray and a stored coordinate of a selected first pixel associated with a ray near the certain ray is greater than a predetermined threshold value.

24. The device of claim 23, wherein the selecting means secondly selects one of the first pixels existing on the ray but not including a noise position for each ray, and wherein the value storing means stores a value of the secondly selected first pixel as a second value for each secondly selected first pixel, the coordinate storing means stores a coordinate of the secondly selected first pixel as a second coordinate for each secondly selected first pixel, and the noise determining means further determines a noise position based on the second coordinate for each secondly selected first pixel, the device further comprising:

a post processing means for processing the second value for each secondly selected first pixel to generate the projection image.

25. The device of claim 23, further comprising:

a storing means for storing a noise position as volume mask data.

26. The device of claim 23, further comprising:

a storing means for storing a list of a plurality of noise positions when a plurality of noise positions are determined.

27. The device of claim 23, further comprising:

an image data storing means for storing the image data of three or more dimensions including the selected first pixels excluding those in which the noise position exist.

28. The device of claim 23, wherein at least one of the value storing means, the coordinate storing means, and the noise determining means includes a central processing unit.

29. The device of claim 23, further comprising:

a graphics processing unit for converting values stored in the value storing means to data in a format suitable for image output.

30. A device for generating a projection image projected on a two-dimensional frame from image data of three or more dimensions that includes a plurality of first pixels of three or more dimensions, each first pixel having a coordinate and a value, and the projection image includes a plurality of second pixels, the device comprising:

a memory; and a processor connected to the memory, wherein the processor:

sets a plurality of rays that pass through some of the first pixels, with each ray corresponding to one of the second pixels;

selects one of the first pixels existing on each of the rays for each ray;

stores a value of the selected first pixel as a first value in the memory for each selected first pixel;

stores a coordinate of the selected first pixel as a first coordinate in the memory for each selected first pixel; and determines a noise position in a plurality of selected first pixels based on the first coordinate for each selected first pixel, wherein said processor determines a stored coordinate of a selected first pixel associated with a certain ray as a noise position when the distance between the stored coordinate of the selected first pixel associated with the certain ray and a stored coordinate of a selected first pixel associated with a ray near the certain ray is greater than a predetermined threshold value.

* * * * *